US012811507B2

(12) United States Patent
Iorio et al.

(10) Patent No.: US 12,811,507 B2
(45) Date of Patent: Nov. 24, 2026

(54) VARIABLE GATE VOLTAGE DRIVING FOR GATE DRIVE CONTROL

(71) Applicant: STMicroelectronics International N.V., Geneva (CH)

(72) Inventors: Alberto Iorio, Aosta (IT); Maurizio Foresta, Aosta (IT); Emilio Volpi, Charvensod (IT)

(73) Assignee: STMicroelectronics International N.V., Geneva (CH)

( * ) Notice: Subject to any disclaimer, the term of this patent is extended or adjusted under 35 U.S.C. 154(b) by 93 days.

(21) Appl. No.: 18/622,577

(22) Filed: Mar. 29, 2024

(65) Prior Publication Data

US 2025/0309775 A1 Oct. 2, 2025

(51) Int. Cl.

*H02M 3/335* (2006.01)
*H02M 1/08* (2006.01)
*H02M 3/00* (2006.01)

(52) U.S. Cl.

CPC ......... *H02M 3/33592* (2013.01); *H02M 1/08* (2013.01); *H02M 3/01* (2021.05)

(58) Field of Classification Search

CPC ............ H02M 3/01; H02M 3/22; H02M 3/24; H02M 3/28; H02M 3/315; H02M 3/335; H02M 3/33507–33561; H02M 3/33569; H02M 3/33571; H02M 3/33573; H02M 3/33576; H02M 3/33584; H02M 3/33592; H02M 1/0003; H02M 1/0006; H02M 1/0025; H02M 1/0029; H02M 1/0032; H02M 1/0035; H02M 1/0058; H02M 1/08; H02M 1/083; Y02B 70/10

USPC ....... 363/15–21.18, 44–48, 81–89, 123–127; 323/223–226, 266, 269–275, 280–285, 323/288, 289, 304, 311–317, 351

See application file for complete search history.

(56) References Cited

U.S. PATENT DOCUMENTS

| | | | |
|---|---|---|---|
| 5,736,890 | A | 4/1998 | Yee et al. |
| 8,067,973 | B2 | 11/2011 | Bakker |
| 9,929,659 | B2 | 3/2018 | Foresta et al. |
| 10,079,549 | B1 | 9/2018 | Chu |
| 10,361,636 | B2 | 7/2019 | Lin |
| 2009/0273951 | A1 | 11/2009 | Ren et al. |
| 2015/0370295 | A1 | 12/2015 | Luo et al. |
| 2016/0226389 | A1 | 8/2016 | Quaglino et al. |
| 2017/0085188 | A1 | 3/2017 | Foresta et al. |

(Continued)

FOREIGN PATENT DOCUMENTS

CN 103683953 A 3/2014

OTHER PUBLICATIONS

Åström et al., "PID Control" and "Implementation" in Advanced PID Control, Research Triangle Park, NC, USA; ISA Society, ch. 3, pp. 64-94 and ch. 13, pp. 407-432 (2006).

(Continued)

*Primary Examiner* — Thienvu V Tran
*Assistant Examiner* — Carlos O Rivera-Perez
(74) *Attorney, Agent, or Firm* — Seed Intellectual Property Law Group LLP

(57) ABSTRACT

A synchronous rectifier driver circuit is configured to drive a synchronous rectifier. The driver circuit drives a gate terminal of a synchronous rectifier switch with a gate drive voltage that is proportional to the current flowing through the synchronous rectifier switch, for at least a portion of the on-phase of the synchronous rectifier switch.

20 Claims, 14 Drawing Sheets

(56) References Cited

U.S. PATENT DOCUMENTS

| | | | | |
|---|---|---|---|---|
| 2017/0244333 | A1 | 8/2017 | Choi et al. | |
| 2019/0393794 | A1 | 12/2019 | Feng et al. | |
| 2020/0036293 | A1* | 1/2020 | Kannan ............. | H02M 3/33523 |
| 2020/0204080 | A1 | 6/2020 | Zhang et al. | |
| 2021/0226548 | A1 | 7/2021 | Chen et al. | |
| 2021/0376709 | A1 | 12/2021 | Zong et al. | |
| 2022/0109375 | A1 | 4/2022 | Iorio et al. | |
| 2023/0135356 | A1 | 5/2023 | Tan | |

OTHER PUBLICATIONS

Kozacek, B. et al., "Analysis of Figure of Merit—power transistor's qualitative parameter," 2015 16th International Scientific Conference on Electric Power Engineering (EPE), 5 pages.

Pan, S. et al., "Adaptive Hybtid Primary/Secondary-Side Digital Control for Series Resonant DC-DC Converters in 48 V VR Applications," *IEEE Journal of Emerging and Selected Topics in Power Electronics*, vol. 3, No. 2, Jun. 2015, pp. 422-429.

Wang, J. et al., "Research on Key Application Issues of Smart Synchronous Rectifier Driver IC in LLC Resonant Converter," *2011 IEEE Energy Conversion Congress and Exposition*, pp. 2765-2770.

* cited by examiner

VARIABLE GATE VOLTAGE DRIVING FOR GATE DRIVE CONTROL

BACKGROUND

Technical Field

The present disclosure is related to synchronous rectifier driver circuits.

Description of the Related Art

Resonant converters are a wide range of switching converters including a resonant circuit that plays an active role in determining the input-output power flow. Considering the most common implementations, in these converters, a full-bridge (or half bridge) consisting of four (or two) power switches (typically power Field Effect Transistors, FET, such as Metal-Oxide-Semiconductor Field-Effect Transistors, MOSFET), supplied by a direct voltage generates a voltage square wave that is applied to a resonant circuit tuned to a frequency close to the fundamental frequency of said square wave. Thereby, because of the selective features thereof, the resonant circuit mainly responds to the fundamental component and negligibly to the higher-order harmonics of the square wave.

As a result, the circulating power may be modulated by changing the frequency of the square wave, while holding the duty cycle constant at 50%. Moreover, depending on the resonant circuit configuration, the currents and/or voltages associated with the power flow have a sinusoidal or a piecewise sinusoidal shape.

These voltages are rectified and filtered so as to provide DC power to a load. In offline applications, to comply with safety regulations, the rectification and filtering system supplying the load is coupled often to the resonant circuit via a transformer providing the isolation between source and load, required by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Presently, among the many types of resonant converters, the so-called LLC resonant converter is widely used, especially in the half bridge version thereof. The designation LLC comes from the resonant circuit employing two inductances/inductors (L) and a capacitor (C).

BRIEF SUMMARY

Embodiments of the present disclosure provide a driver circuit of a synchronous rectifier of a resonant converter that effectively and efficiently drives rectifier switches of the synchronous rectifier. In one embodiment, a synchronous rectifier includes a driver circuit that drives a gate terminal of a synchronous rectifier switch with a gate drive voltage that is proportional to the current flowing through the synchronous rectifier switch, for at least a portion of the on-phase of the synchronous rectifier switch.

In one embodiment, a synchronous rectifier includes a driver circuit that drives a gate terminal of a synchronous rectifier switch with a gate drive voltage that is based on a gate drive reference signal. The gate drive reference voltage is generated based, at least in part, on a voltage or current associated with the synchronous rectifier switch multiplied by a gain parameter. The driver circuit automatically and continuously updates the gain parameter to maintain efficient and effective driving of the rectifier switch.

Although embodiments described herein may sometimes describe, with particularly, driving of a single rectifier switch of a resonant converter. However, in practice, embodiments of the present disclosure may also drive a second rectifier switch in a same or similar manner as driving of the first rectifier switch.

In one embodiment, a method includes driving a rectifier switch of a synchronous rectifier with a gate drive signal in cycles including an on-phase and an off-phase. The method includes estimating an output current of the rectifier switch measuring the voltage across the rectifier switch during the on-phase and adjusting a voltage of the gate drive signal during at least a portion of the on-phase based on the output current.

In one embodiment, a device includes a synchronous rectifier driver circuit configured to drive a first rectifier switch. The driver circuit includes a shaping circuit configured to receive a drain voltage signal indicating a voltage of a drain terminal of the rectifier switch and to generate a gate drive reference voltage. The shaping circuit is configured to a voltage regulator configured to receive the gate drive reference voltage and a supply voltage and to generate driver supply voltage based on the gate drive reference voltage. The shaping circuit is configured to a gate driver having a first input configured to receive the gate drive reference voltage, a supply input configured to receive the driver supply voltage, and an output configured to output a gate drive signal to a gate terminal of the rectifier switch.

In one embodiment, a method includes driving, with a driver circuit of a resonant converter, a rectifier switch of the resonant converter and receiving, with a shaping circuit of the driver circuit, a drain voltage of the rectifier switch and generating, with the shaping circuit, a gate drive reference voltage based on the drain voltage. The method includes generating, with a voltage regulator of the driver circuit, a driver supply voltage based on the gate drive reference voltage and receiving the driver supply voltage at a supply voltage terminal of a gate driver of the driver circuit. The method includes receiving the gate drive reference voltage at an input terminal of the gate driver and outputting a gate drive signal from the gate driver to a gate terminal of the rectifier switch.

In one embodiment, a method includes driving, with a driver circuit of a resonant converter, a rectifier switch of the resonant converter with a gate drive signal based on a gate drive reference signal and receiving, with a shaping circuit of the driver circuit, a drain voltage of the rectifier switch. The method includes generating, with the shaping circuit, the gate drive reference voltage based on the drain voltage and a gain parameter. The method includes performing, with the shaping circuit, a first comparison of the gate drive reference voltage to a first threshold during a first cycle of the gate drive signal and adjusting the gain parameter for a second cycle of the gate drive signal based, at least in part, on the first comparison.

In one embodiment, a device includes a synchronous rectifier driver circuit configured to drive a rectifier switch with a gate drive signal and including a shaping circuit. The shaping circuit is configured to receive a drain voltage signal indicating a voltage of a drain terminal of the rectifier switch and to generate a gate drive reference voltage based on the drain voltage and a gain parameter. The shaping circuit is configured to perform a first comparison of the gate drive reference voltage to a first threshold during a first cycle of the gate drive signal and adjust the gain parameter for a second cycle of the gate drive signal based, at least in part, on the first comparison.

In one embodiment, a method includes driving a rectifier switch of a synchronous rectifier with a gate drive signal and generating a gate drive reference voltage based on a product of a drain voltage of the rectifier switch and a gain parameter. The method includes performing a first comparison of the gate drive reference voltage and a first threshold and adjusting the gain parameter based, at least in part, on the first comparison.

BRIEF DESCRIPTION OF THE DRAWINGS

The embodiments of the present disclosure will now be described with reference to the drawings, which are provided purely to way of non-limiting example and in which.

The features and advantages of the present disclosure will become apparent from the following detailed description of practical embodiments thereof, shown by way of non-limiting example in the accompanying drawings, in which.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment," "in one embodiment," or the like that may be present in various points of this description do not necessarily refer to one and the same embodiment. Moreover, particular conformations, structures, or characteristics may be combined in any adequate way in one or more embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known algorithms associated with facial recognition, facial detection, and facial authentication have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
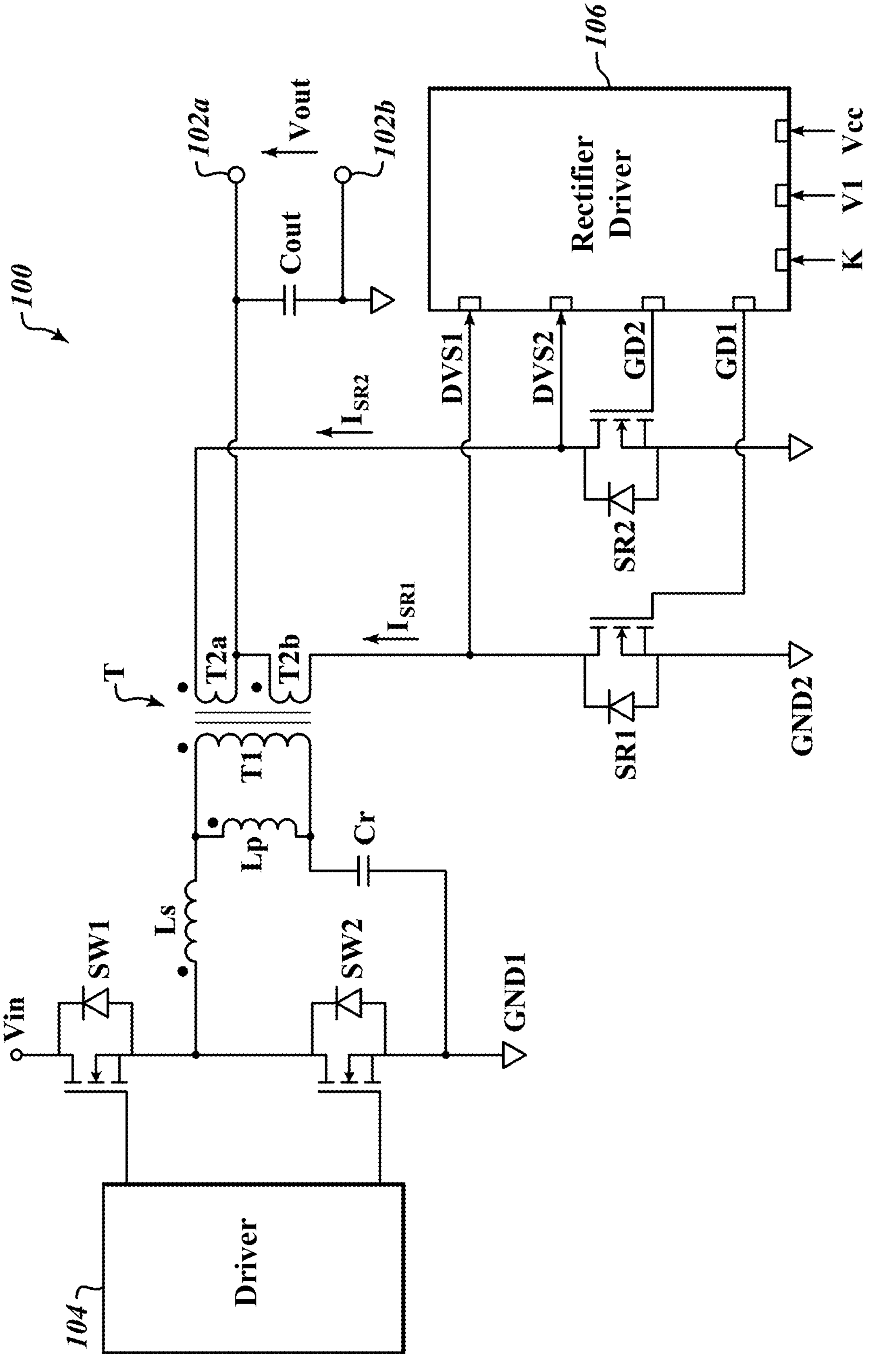
FIG. 1 is a schematic diagram of a resonant converter, in accordance with one embodiment.

FIG. 1 is a schematic diagram of a resonant converter 100, in accordance with one embodiment. The resonant converter 100 may be an LLC resonant converter. As will be set forth in more detail below, the components of the resonant converter cooperate to provide a gate drive voltage for rectifier switches of the resonant converter that results in more efficient operation in terms of power consumption while maintaining the effectiveness of the resonant converter 100. Further details regarding resonant converters can be found in U.S. patent application Ser. No. 17/490,793, filed on Sep. 9, 2021, subsequently issued as U.S. Pat. No. 11,817,791 on Nov. 14, 2023. U.S. patent application Ser. No. 17/490,793 is incorporated herein in its entirety.

As will be set forth in more detail below, in one embodiment, the resonant converter 100 includes a synchronous rectifier that includes a driver circuit. The driver circuit drives a gate terminal of a synchronous rectifier switch with a gate drive voltage that is proportional to the current flowing through the synchronous rectifier switch, for at least a portion of the on-phase of the synchronous rectifier switch.

As will be set forth in more detail below, in one embodiment, the resonant converter 100 includes a synchronous rectifier includes a driver circuit. The driver circuit drives a gate terminal of a synchronous rectifier switch with a gate drive voltage that is based on a gate drive reference signal. The gate drive reference voltage is generated based, at least in part, on a voltage or current associated with the synchronous rectifier switch multiplied by a gain parameter. The driver circuit automatically and continuously updates the gain parameter to maintain efficient and effective driving of the rectifier switch.

The resonant converter 100 includes an input terminal that receives a high input voltage Vin and an input terminal coupled to the ground voltage GND1. In other words, an input voltage Vin is applied across the input terminals of the resonant converter 100. The input voltage Vin may be a DC voltage provided by a DC generator such as a battery or another DC voltage source. The input voltage Vin can also be generated by rectifying an AC voltage with a rectifier circuit such as a bridge rectifier. The bridge rectifier may include a filter circuit, such as a capacitor.

The resonant converter 100 includes a high output terminal 102*a* and a low output terminal 102*b*. An output voltage Vout is output across the output terminals 102*a* and 102*b*. The output voltage Vout may be a DC output voltage. Alternatively, or additionally, an output current Iout may be provided across the terminals 102*a* and 102*b*. The output voltage or the output current may be utilized to drive a load.

In one embodiment, the resonant converter 100 includes a half bridge circuit including two switches, SW1 and SW2. The switches SW1 and SW2 are coupled in series between the input terminals of the resonant converter 100.

In one embodiment, the switches SW1 and SW2 are NMOS transistors. The drain terminal of SW1 is coupled to the high input voltage terminal. The source terminal of SW1 is coupled to the drain terminal of SW2. The source terminal of SW2 is coupled to ground.

In one embodiment, the resonant converter 100 includes a driver circuit 104 the drives the switches SW1 and SW2 of the half bridge circuit. Further details regarding the driver circuit 104 are provided below.

A transformer T includes, on an input side, a primary winding T1 and, on an output side, a central tapped secondary winding including a first secondary winding T2*a* and a second secondary winding T2*b* connected in series. The input side of the resonant circuit block includes a first inductance Ls coupled between the output node of the half bridge circuit and the primary winding T1. The input side of the resonant circuit block includes a second inductance Lp and a capacitor Cr. The second inductance Lp is coupled in parallel with the primary winding T1. The capacitor Cr is coupled between the second inductance Lp and the source terminal of the switch SW2. Other configurations of the resonant circuit block on the input side can be utilized without departing from the scope of the present disclosure. In practice, the two windings T1 and T2 may not be perfectly coupled. Furthermore, there may also be a leakage inductance and a magnetizing inductance associated with the transformer. A leakage inductance may be modelled via an inductance connected in series with the primary winding T1. Conversely, the magnetizing inductance of the transform T (used to model the magnetic flux) may be modelled with an inductance connected in parallel with the primary winding T1. Thus, the inductance Ls may correspond to the leakage inductance of the transformer T and may be implemented with an inductor connected in series with the primary winding T1, or may result from both the leakage inductance of the transformer T and such an inductor. Similarly, the inductance Lp may correspond to the magnetizing inductance of the transformer T and may be implemented with an inductor connected in parallel with the primary winding T1, or may result from both the magnetizing inductance of the transformer T and such an inductor. Thus, in practice, the inductances Lp and Ls and the transformer T may be integrated in a single component.

As mentioned previously, the secondary side of the transformer T includes a center-tap arrangement, i.e., the secondary winding T2 includes a first terminal coupled to the drain terminal of a first rectifier switch SR1, a second terminal coupled to the drain of a second rectifier switch SR2, and a center-tap terminal coupled to the output terminal 102*a*. The rectifier switches SR1 and SR2 correspond to NMOS transistors, in one embodiment. The rectifier switches SR1 and SR2 can include other types of switches without departing from the scope of the present disclosure.

As will be set forth in more detail below, the switches SR1 and SR2 perform a rectification function. Accordingly, due to the rectification function of the transistors SR1 and SR2, the terminal 102*a* corresponds to the positive output terminal and the terminal 102*b* corresponds to the negative output terminal, which usually corresponds to a second ground GND2.

In one embodiment, the resonant converter 100 may also include an output filter connected between the output terminals 102*a* and 102*b*. For example, in FIG. 1 a capacitor Cout is connected (e.g., directly) between the output terminals 102*a* and 102*b*.

Returning to the input side of the resonant converter 100, the gate terminals of the switches SW1 and SW2 are driven via a driver circuit 104, which is configured to generate respective drive signals HSGD and LSGD for the electronic switches SW1 and SW2.

In one embodiment, the driver circuit 104 drives the switches SW1 and SW2 usually in a manner selected to apply a square wave at a frequency close to that of the resonant circuit to the switching node HB, i.e., the node to which the source of SW1 and the drain of SW2 are connected. In this way the resonant tank (Lp, Ls and Cr) behaves as a tuned filter and the current is formed by the single fundamental harmonic of the Fourier series development, and is, therefore, practically sinusoidal.

In one embodiment, the driver circuit 104 is configured to generate the drive signals HSGD and LSGD in order to repeat the following four phases for each switching cycle: during a first time-interval, or phase, includes closing the first electronic switch SW1 and opening the second electronic switch SW2, by which the switching node HB is connected to the positive the input voltage Vin. A second time-interval or phase includes opening both the first and the second electronic switch SW1/SW2. A third time-interval or phase includes opening the first electronic switch SW1 and closing the second electronic switch SW2, whereby the switching node HB is connected to the negative input node, e.g., ground GND1. A fourth time-interval or phase includes opening both the first and the second electronic switch SW1/SW2.

The second and fourth time-intervals may be useful in order to use the resonances of resonant circuit in order to achieve soft switching. For example, the LLC topology shown in FIG. 1 permits a ZVS (Zero Voltage Switching) of the switches SW1 and SW2 on the primary side and a ZCS (Zero Current Switching) of the diodes D1 and D2 on the secondary side, which thus permits to operate the converter at high switching frequencies with high efficiency.

In one embodiment, the electronic converter provides via the output terminals 102*a* and 102*b* a voltage Vout and a current Iout. Often a closed-loop (usually implemented with a negative-feedback control system) keeps thus either the output voltage Vout or the output current Iout of the converter constant upon changing the operating conditions, e.g., variation of the input voltage Vin and/or the output load 30. As mentioned before, the regulation of the converter output voltage Vout or the output current Iout is achieved by changing the switching frequency of the square waveform at the switching node HB/the input of the resonant tank.

Returning to the output side of the resonant circuit 100, in one embodiment, resonant circuit 100 includes a synchronous rectifier driver 106. The synchronous rectifier driver 106 is configured to drive the switches SR1 and SR2 in order to emulate an ideal diode. The core function of synchronous rectifier driver 106 is to switch on each synchronous rectifier switch SR1 and SR2 whenever the corresponding transformer half winding T2*a* or T2*b* starts conducting.

Each of the synchronous rectifier switches SR1 and SR2 has an associated body diode. Accordingly, the synchronous rectifier driver 106 switches-on a given synchronous rectifier switch SR1 and SR2 when the respective diode starts conducting and switches-off the synchronous rectifier switch when the flowing current approaches zero. In order to achieve high efficiency, the rectifier driver 106 controls the channel conduction time in order to reduce the diode conduction time.

In the simplified view of FIG. 1, the driver 106 includes an input terminal coupled to the drain terminal of the rectifier switch SR1. The driver 106 includes an input terminal coupled to the drain terminal of the rectifier switch SR2. The driver 106 includes an output terminal coupled to the gate terminal of the first rectifier switch SR1. The driver 106 includes an output terminal coupled to the gate terminal of the second driver switch SR2. The driver 106 includes an input terminal that receives a value k, an input terminal that receives a value V1, and an input terminal that receives a supply voltage VCC. Though not shown, the driver 106 may also include terminals that receive a ground reference voltage. The driver 106 can include other terminals or combinations of terminals without departing from the scope of the present disclosure.

In one embodiment, the driver 106 applies a first gate drive signal GD1 to the first rectifier switch SR1. The driver 106 applies a second gate drive signal GD2 to the second rectifier switch SR2. The gate drive signals turn the rectifier switches on and off. A first rectifier current ISR1 flows through the first rectifier switch SR1 when the first rectifier switch SR1 is turned on. A second rectifier current ISR2 flows through the second rectifier switch SR2 when the second rectifier switch SR2 is turned on.

The driver 106 receives a drain voltage signal DVS1 corresponding to a drain voltage of the switch SR1. The driver 106 receives a drain voltage signal DVS2 corresponding to a drain voltage of the switch SR2. As will be set forth in more detail below, the driver 106 senses the drain voltage signals DVS1 and DVS2 and generates the gate drive signals GD1 and GD2 based, in part, on the sensed drain voltage signals DVS1 and DVS2.

In one embodiment, the driver 106 generates the gate drive signals GD1 and GD2 in accordance with the following formula:

$$VGD = V1 + k * DVS,$$

Where VGD is a voltage level of the gate drive signals GD. In one embodiment, the voltage value V1 and the gain factor k are received via dedicated input terminals of the driver 106, as shown in FIG. 1. However, the voltage value V1 and the gain parameter k can be generated internally within the driver 106 based on externally sensed parameters such as ISR1, ISR2, DVS1, DVS2, or other sensed values.

In one embodiment, the received or generated values V1 and k set a proportionality between the gate drive voltage and DVS. This method can allow selectively increasing an internal on resistance RDSON of the corresponding rectifier switch SR in order to improve the efficiency of the switches SR. The internal on resistance RDSON corresponds to the effective resistance of the switch SR on the switch SR is conducting a current. In one embodiment, the driver 106 selectively increases RDSON of the rectifier switch SR when the current approaches 0 in order to amplify the DVS voltage signal to better detect the zero crossing of the rectifier switch current.

Figure 2A:
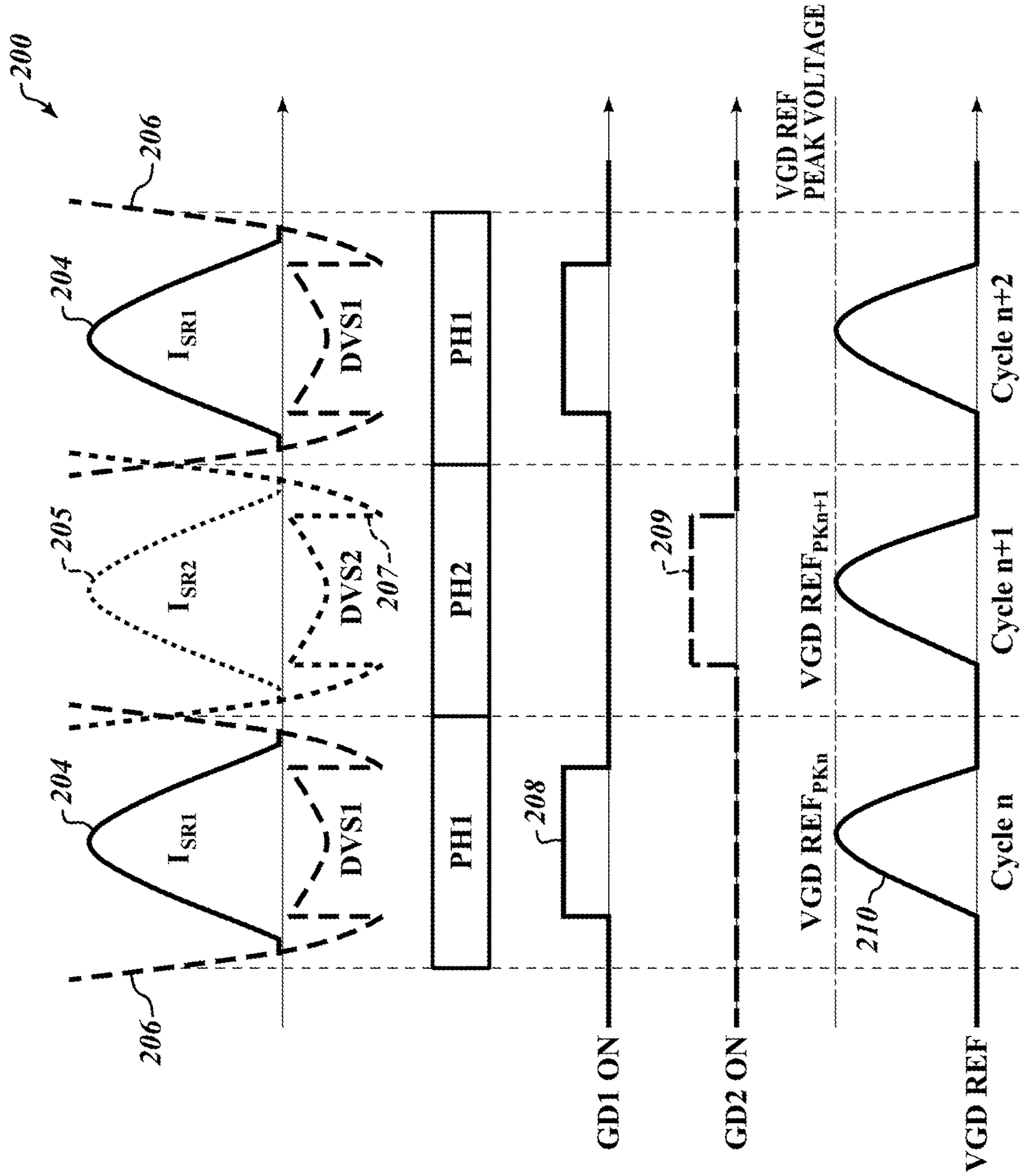
FIGS. 2A and 2B includes graphs of signals associated with a resonant converter, in accordance with one embodiment.
Figure 2B:
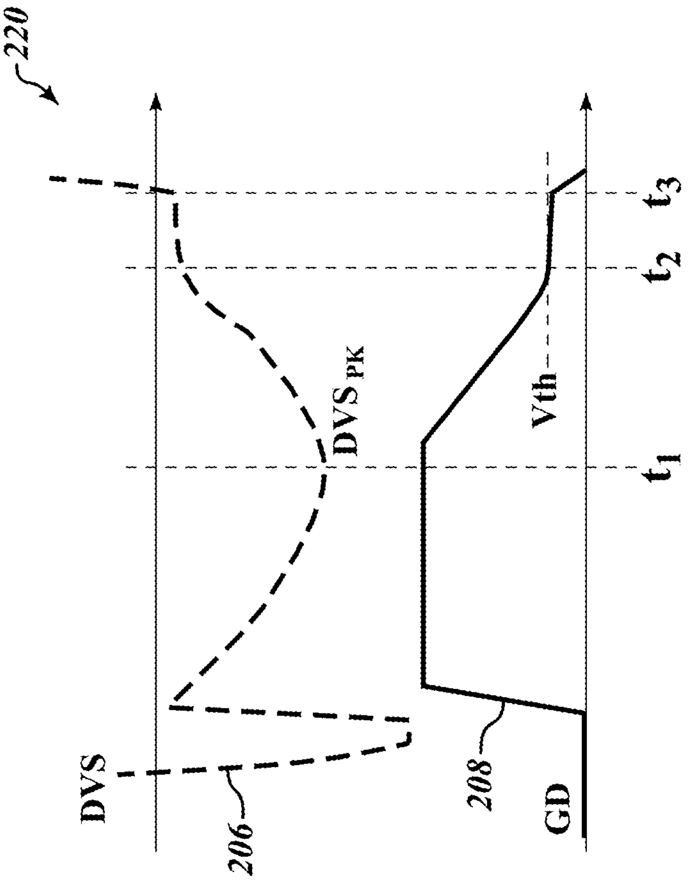

The function of the driver 106 can be better understood in relation to FIGS. 2A and 2B. FIG. 2A includes a graph 200 that provides a simplified illustration of signals and values associated with operation of the rectifier switches SR by the driver 106.

In a simplified manner, during the first phase, labeled PH1, the gate drive signal GD1, represented by the curve 208, goes high, thereby turning on the rectifier switch SR1. The gate drive signal GD2, represented by the curve 209 is low during the first phase. The curve 204 represents the current flowing through the rectifier switch SR1 during the first phase. The curve 206, in dashed lines, represents the drain voltage signal DVS1 of the rectifier switch SR1. The curve 210 illustrates an internal reference signal VGD_REF, as will be described in more detail below.

During a second phase, labeled PH2, GD1 is low and GD2 goes high, thereby turning on the rectifier switch SR2. The curve 205 represents a current flowing through the rectifier switch SR2 during the second phase. The curve 207, in dashed lines, represents the drain voltage signal DVS2 of the rectifier switch SR2.

In the view of FIG. 2A, when the current IS about to begin to flow the corresponding drain voltage signal DVS goes from a high voltage to a negative voltage. When the current flows through the body diode of the rectifier switch SR, The drain voltage signal DVS becomes negative. The rectifier circuit detects this condition and turns on the gate drive signal GD in response. Accordingly, the gate drive signal GD goes high after the current ISR begins to flow. When the gate drive signal GD goes high, the drain voltage signal DVS goes to substantially 0 V and afterward follows a shape that is substantially a mirror of the shape of the current ISR. When GD goes low and the switch SR is turned off and the current ISR is still flowing, the drain voltage signal DVS returns negative. The drain voltage signal DVS goes to a high voltage only after the ISR current is 0. As described previously, the view of FIG. 2A is simplified. In practice, the gate drive signal GD and the drain voltage signal DVS have different shapes, as illustrated in FIG. 2B.

In FIG. 2B, when the current ISR (not shown) begins to flow, the corresponding DVS drops to a low-voltage, as illustrated in the curve 206. GD then goes high as illustrated in the curve 208. The on-phase of a switch SR then begins and DVS rises to a voltage just below 0 V. For the first half of the phase, the gate drive signal GD has a substantially flat value. However, halfway through the phase, at time t1, the driver 106 adjusts the manner in which the gate drive signals generated. In particular, as described previously, at time t1, or shortly after time t1, the driver circuit 106 begins generating the gate drive signal GD1 with a voltage level VGD equal to V1+k*DVS. In one embodiment, the driver 106 utilizes the peak detector to detect the negative peak in DVS or the corresponding positive peak and ISR in order to identify the midpoint time t1 of the corresponding on-phase.

After the time t1, the driver 106 is working to discharge the gate capacitance of the rectifier switch SR2 reach the target voltage VGD_REF set by the driver 106, as will be described in more detail below. The terms V1 and k can be programmed through external programming pins in order to be adapted to different external loads of the resonant circuit 100.

Between times T1 and T2, the gate drive signal GD decreases. At time T2, the gate drive signal GD is very close to the threshold voltage Vth of the corresponding rectifier switch SR. When the gate drive signal is approaching the threshold voltage of the rectifier switch SR, the internal on resistance RDSON of the switch SR begins to increase significantly. This results in a change in the slope of DVS. In this condition, the rectifier switch SR is working with a high RDSON. At time T3, where ISR (not shown) returns to zero, DVS crosses zero quickly. The zero-crossing of DVS is detected by the driver 106. The driver 106 brings the gate drive signal GD to 0 at time T3 in order to turn off the rectifier switch SR. A zero-crossing detector can be utilized by the driver 106 to detect a zero-crossing of DVS.

In one embodiment, the gate driving voltage of the rectifier switches SR is controlled in a manner that is proportional to the current flowing through the rectifier switches. This has the effect of shaping DVS for improved gate drive control.

Figure 3:
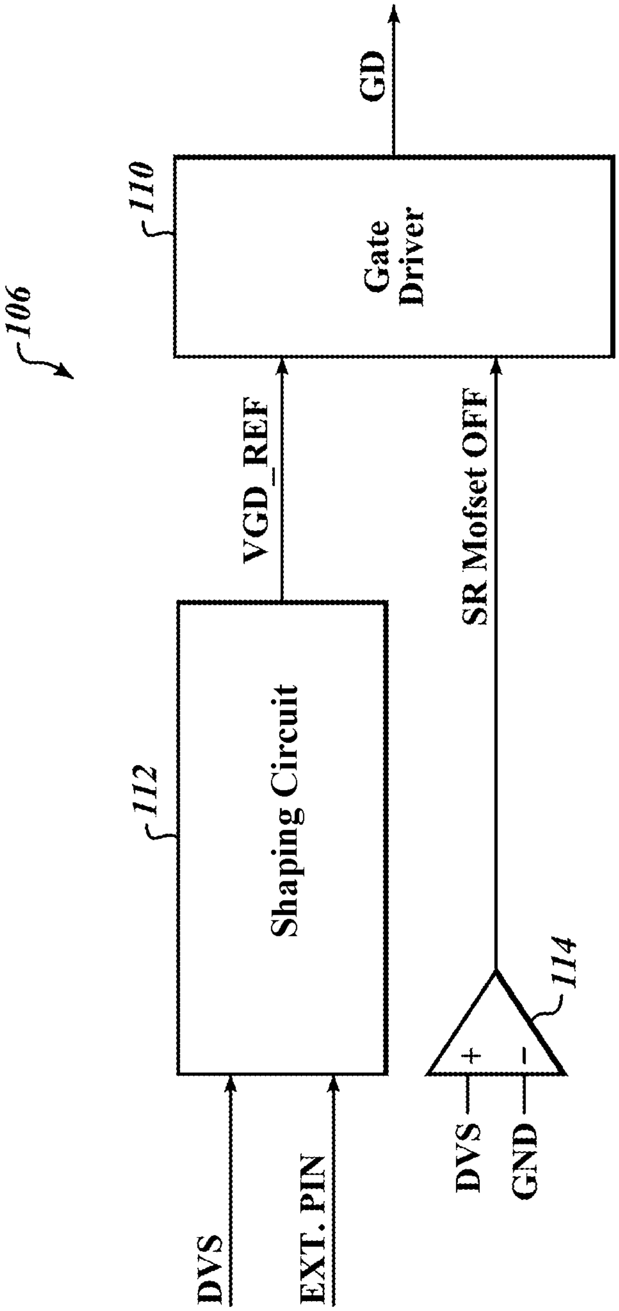
FIG. 3 is a block diagram of a driver circuit of a synchronous rectifier of a resonant converter, in accordance with one embodiment.

FIG. 3 is a block diagram of a driver circuit 106, in accordance with one embodiment. The driver circuit 106 of FIG. 3 is one example of a driver circuit 106 of FIG. 1. The driver circuit 106 includes a gate driver 110. The gate driver 110 generates the gate drive signal GD. The driver circuit 106 includes a shaping circuit 112 that generates the gate drive reference signal VGD_REF. As will be explained in more detail below, the gate drive reference signal VGD_REF is provided to the gate driver 110 and the great driver 110 generates the gate drive signal based on the gate drive reference signal VGD_REF. The driver circuit 106 also includes a zero-crossing detector 114. The zero-crossing detector 114 can correspond to a comparator that receives ground voltage on a noninverting input and the drain voltage signal DVS on an inverting input. Once DVS crosses ground, a signal is generated by the comparator 114 that causes the gate driver 110 to turn off the rectifier switch SR by bringing the gate drive signal to 0.

The shaping circuit 112 receives the drain voltage signal DVS and the values V1 and k via external pins, such as the external input shown in FIG. 1. The shaping circuit 112 generates VGD_REF in the following manner:

$$\text{VGD\_REF} = V1 + k * DVS.$$

While FIG. 3 illustrates only a single gate driver 110, a single shaping circuit 112, and a single comparator 114, in practice, the driver circuit 106 includes a pair of each of these components. A first shaping circuit 112 may receive DVS1 and generate VGD_REF for a first gate driver 110. The first gate driver 110 can generate the first gate drive signal GD1 for the first rectifier switch SR1. A first comparator 114 can generate a turnoff signal for the first gate driver 110. A second shaping circuit 112 can receive DVS two and generate VGD_REF for a second gate driver 110 that provides a second gate driver signal GD2 to the second rectifier switch SR2. The second comparator 114 can provide shutoff signal to the second gate driver 110.

Figure 4:
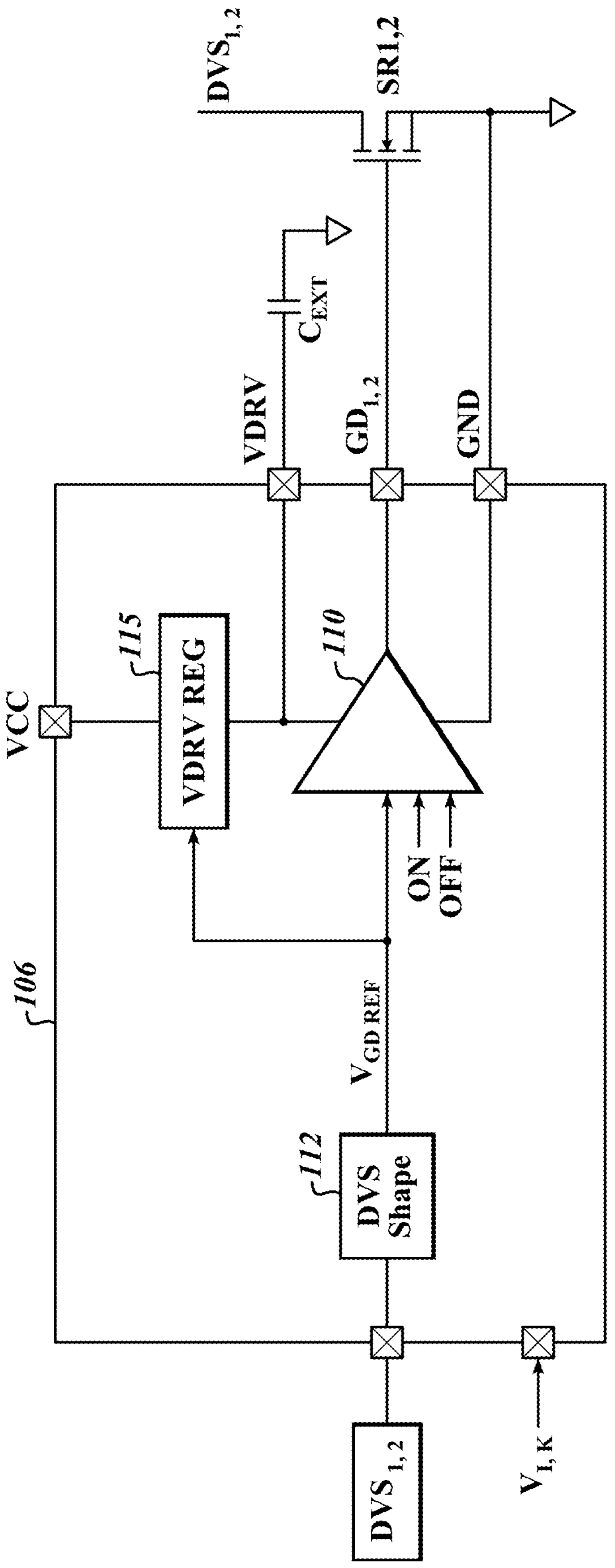
FIG. 4 is a block diagram of a driver circuit of a synchronous rectifier of a resonant converter, in accordance with one embodiment.

FIG. 4 is a schematic diagram of a driver circuit 106, in accordance with one embodiment. The driver circuit 106 is one example of the driver circuit 106 of FIG. 1 or FIG. 3. The driver circuit 106 includes a VDS shaping circuit 112 that generates the reference signal VGD_REF as described previously, based on DVS, V1, and k, or in some other suitable manner.

The driver circuit 106 also includes a voltage regulator 115. The voltage regulator 115 receives VGD_REF from the shaping circuit 112. The voltage regulator 115 receives the supply voltage VCC from an external input. The voltage regulator 115 generates a driver supply voltage VDRV based on VGD_REF and VCC. The voltage regulator 115 supplies the driver supply voltage VDRV to the gate driver 110. An external capacitor CEXT is coupled to a terminal of the driver circuit 106 and charged to the voltage VDRV in order to remove or reduce fluctuations in VDRV. Alternatively, the capacitor CEXT can be an internal component of the driver circuit 106. VDRV helps to enable the driver circuit 110 to generate the gate drive signal GD in order to drive the rectifier switch is SR in the selected efficient manner.

The gate driver 110 includes a first input that receives VGD_REF from the shaping circuit 112. The gate driver 110 also includes an input that receives an ON signal for turning on the driver signal. The gate driver 110 also includes an input that receives an OFF signal for turning off the driver signal. In practice, a single terminal may receive a signal that turns on and off the driver signal. A high supply terminal of the driver 110 receives the driver supply voltage VDD RV from the regulator 115 and the external capacitor CEXT.

In one embodiment, the drain voltage signal DVS is based on RDSON and ISR. In particular:

$$DVS = RDSON * ISR.$$

Furthermore, RDSON is based on the gate to source voltage of the rectifier switch SR. As the source of SR is coupled to ground, RDSON can be controlled by controlling the voltage level VGD of the gate drive signal GD. As VGD decreases, ISR increases. Furthermore, the power loss of the rectifier switch SR is given by the following formula:

$$\text{Ploss} = RDSON * (ISR)^{\wedge}2 + \text{VDRV} * \text{VCC} * fs * Cg,$$

where fs is the switching frequency of the rectifier switch SR and Cg is the gate capacitance of the rectifier switch SR.

In one example, VCC is 12 V and VDRV is approximately 10.5 V. In practice, VDRV can vary during use of the driver circuit 106. With reference to FIGS. 2A and 2B, the voltage regulator 115 can generate VDRV based on the average peak value of VGD_REF across a number of cycles. For example, FIG. 2A illustrates cycles n, n+1, and n+2. The voltage regulator 115 can measure and record the peak voltage level of VGD_REF in a plurality of cycles and can generate VDRV of the average of VGD_REF across a selected number of cycles. In one embodiment, VDRV is changed between cycles but not during cycles.

Continuing with reference to FIG. 2B, prior to time t1, VGD is equal to VDRV. After time t1, VGD is equal V1+k*DVS, as described previously.

Returning to FIG. 4, As described previously, the driver circuit 106 can generate a separate VGD_REF and the gate driver signal GD for each rectifier switch SR. Accordingly, the driver circuit 106 may include two copies of each of the components shown in FIG. 4.

Figure 5:
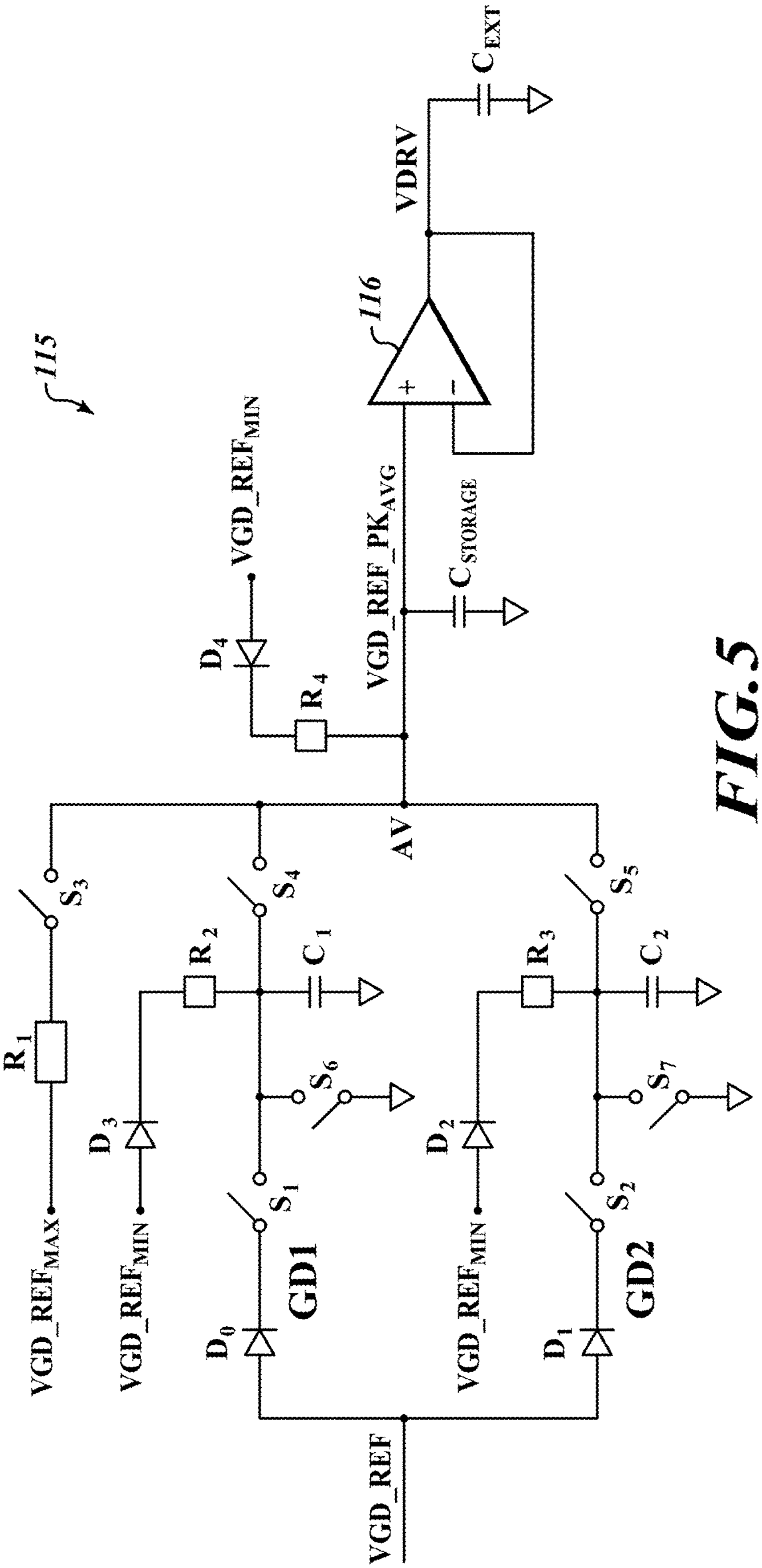
FIG. 5 is a schematic diagram of a voltage regulator of the driver circuit of a synchronous rectifier, in accordance with one embodiment.

FIG. 5 is a schematic diagram of a voltage regulator 115, in accordance with one embodiment. The voltage regulator 115 of FIG. 5 is one example of the voltage regulator 115 of FIG. 4. The voltage regulator 115 receives VGD_REF from the shaping circuit 112. In one embodiment, VGD_REF received at the input of the voltage regulator 115 is a multiplexed signal. In particular, as described previously, there are two shaping circuits 114. A first shaping circuit 112 outputs VGD_REF for the first rectifier switch SR1. A second shaping circuit 112 outputs VGD_REF for the second rectifier switch SR2. Accordingly, though not shown, a multiplexer may receive both of the VGD_REF signals and may provide them to the voltage regulator 115 in a multiplexed manner. The voltage regulator 115 includes a node AV that stores the average value of VGD_REF or both SR1 and SR2. A capacitor Cstorage has a first terminal coupled to the node AV and the second terminal coupled to ground.

The voltage regulator 115 includes a diode DO, a switch S1, and a switch S4 coupled between VGD_REF and the node AV. A capacitor C1 has a first terminal coupled between the switches S1 and S4 and a second terminal coupled to ground. A diode D3 and a resistor R2 are coupled between VGD_REFmin and the first terminal of the capacitor C1. This corresponds to a circuit branch for the VGD_REF for the first rectifier switch SR1.

When SR1 is initially conducting, the switch S1 closes. If VGD_REF1 is greater than the voltage stored on the first terminal of the capacitor C1, then a current will flow through the diode DO and will charge the capacitor C1. When DVS for the rectifier switch SR1 reaches the peak voltage, the switch S1 opens and the switch S4 closes. This causes charge to distribute between Cstorage and C1. If the voltage on C1 is greater than the voltage on Cstorage, the voltage on Cstorage will increase. If the voltage on Cstorage is greater than the voltage on C1, the voltage on Cstorage will decrease. The capacitance of the capacitor C1 is related to the capacitance of Cstorage divided by the number of cycles for which the average is to be computed. The switches S2, S3, and S5 are open when either S1 or S4 is closed.

The voltage regulator 115 includes a diode D1, a switch S2, and a switch S5 coupled between VGD_REF and the node AV. A capacitor C2 has a first terminal coupled between the switches S2 and S5 and a second terminal coupled to ground. A diode D2 and a resistor R3 are coupled between VGD_REFmin and the first terminal of the capacitor C2. This corresponds to a circuit branch for the VGD_REF for the second rectifier switch SR2.

When SR2 is initially conducting, the switch S2 closes. If VGD_REF2 is greater than the voltage stored on the first terminal of the capacitor C2, then a current will flow through the diode D1 and will charge the capacitor C2. When DVS for the rectifier switch SR2 reaches the peak voltage, the switch S2 opens and the switch S5 closes. This causes charge to distribute between Cstorage and C2. If the voltage on C2 is greater than the voltage on Cstorage, the voltage on Cstorage will increase. If the voltage on Cstorage is greater than the voltage on C2, the voltage on Cstorage will decrease. The capacitance of the capacitor C2 is related to the capacitance of Cstorage divided by the number of cycles for which the average is to be computed. The switches S1, S3, and S4 are open when either S1 or S4 is closed.

The voltage regulator 115 is also configured to operate selectively in a burst mode. In the burst mode, the switches S1, S2, S4, and S5 are all open and the switch S3 is closed. This causes a maximum voltage VGD_REFmax to be supplied to the capacitor Cstorage. This charges the capacitor Cstorage to the maximum voltage VGD_REFmax.

A diode D4 and the resistor R4 are also coupled between VGD_REFmin and the capacitor Cstorage. Accordingly, if the voltage on the capacitor C storage drops below VGD_REFmin, the diode D4 becomes conducting and C storage is charged to the minimum voltage VGD_REFmin.

In one embodiment, the voltage regulator 115 includes a switch S6 coupled in parallel with the capacitor C1. The switch S6 can be utilized to selectively initialize or reset the voltage of the capacitor C1 prior to closing the switch S1. For example, the voltage on the capacitor C1 can be initialized or reset to ground by closing the switch S6. After resetting the voltage on the capacitor C1, the switch S6 is opened. The switch S1 can then be closed to perform the functions described above.

In one embodiment, the voltage regulator 115 includes a switch S7 coupled in parallel with the capacitor C2. The switch S7 can be utilized to selectively initialize or reset the voltage of the capacitor C2 prior to closing the switch S2. For example, the voltage on the capacitor C2 can be initialized or reset to ground by closing the switch S7. After resetting the voltage on the capacitor C2, the switch S7 is opened. The switch S2 can then be closed to perform the functions described above.

The voltage regulator 115 includes an operational amplifier 116. The operational amplifier includes a noninverting input coupled to the capacitor Cstorage, an output that applies the voltage VDRV, and an inverting input coupled to the output in a feedback configuration. The external capacitor Cext may also be coupled to the output of the operational amplifier 116.

In one embodiment, the resistor R1 has a value of 5 kΩ, the resistor R2 has a value of 50 kΩ, the resistor R3 has a value of 50 kΩ2, and the resistor R4 has a value of 5 kΩ. In one embodiment, C1 is equal to C2 and to Cstorage/m, where m is the number of cycles for which the average is calculated. Other values can be utilized for the resistors R1-R4 and for the capacitors C1, C2, and Cstorage without departing from the scope of the present disclosure.

There are various benefits associated with utilizing the voltage regulator 115 and the driver circuit 106 of FIGS. 4 and 5. For example, the DVS shaping control always starts at the right voltage level during the rectifier switch turn off phase (t>t1). The variation of the gate voltage level as a function of the output current increases the conversion efficiency, especially for high frequency applications, because of light load the gate switching losses are reduced. In one embodiment, in a steady-state condition when the converter works at medium/high loads, the gate driving is set to the desired maximum value VGD_REFmax when the load is reduced, the gate driving voltage is also reduced.

Figure 6:
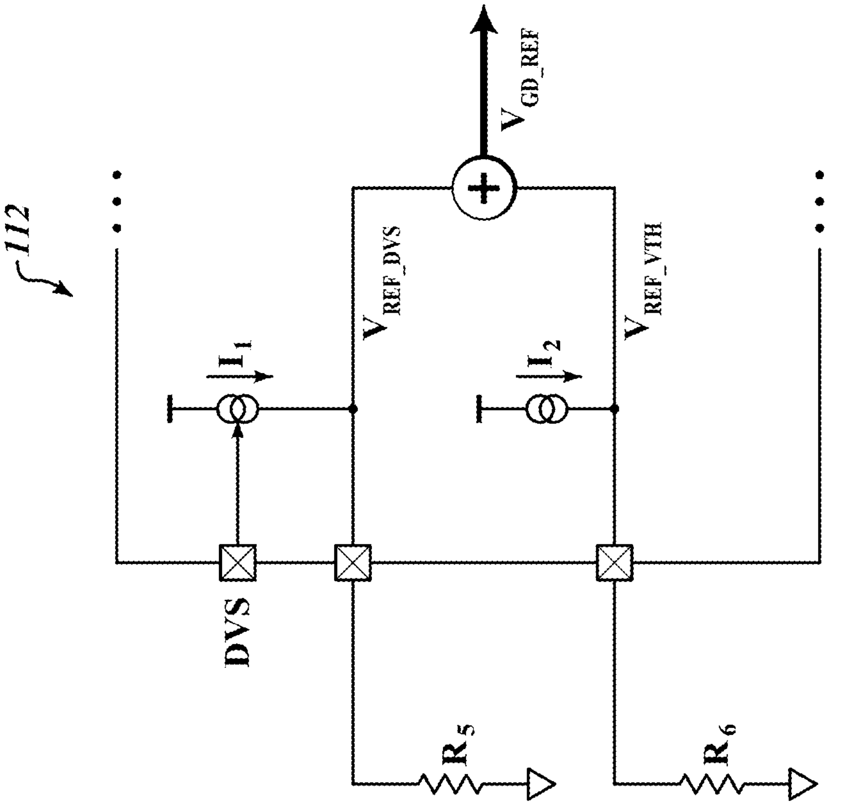
FIG. 6 is a schematic diagram of a portion of a shaping circuit of a driving circuit of a synchronous rectifier, in accordance with one embodiment.

FIG. 6 is a simplified schematic diagram of a shaping circuit 112, in accordance with one embodiment. The shaping circuit 112 is one example of a shaping circuit 112 of FIGS. 1, 3, and 4. The shaping circuit 112 includes a voltage controlled current source that generates a current I1 based on an internal resistance R7 of the current source and DVS. An external resistor R5 is coupled to an external terminal coupled to the output of the first current source. The driver circuit 106 includes a second current source that generates a current I2. An external resistor R6 is coupled to an external terminal coupled to the output of the second current source.

The voltage at the output of the first current source is VREFDVS. The voltage at the output of the second current source is VREFVTH. A summer outputs VGD_REF as the sum of VREFDVS and VREFVTH.

In one embodiment, VREFVTH is equal to I2*R6 and is a constant corresponding to V1. In one embodiment, VREFDVS is equal to I1*R5, which is equal to DVS*R5/R7. The result is that the game factor k is equal to R5/R7. Accordingly, VREFDVS=k*DVS. This is one way in which the values k and V1 can be set by external inputs via the resistors R5 and R6.

Figure 7:
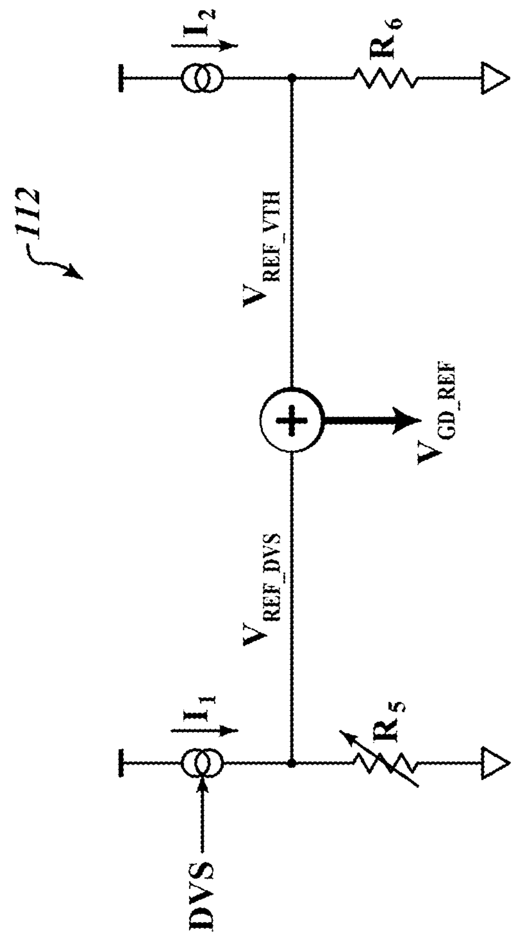
FIG. 7 is a schematic diagram of a portion of a shaping circuit of a driving circuit of a synchronous rectifier, in accordance with one embodiment.

FIG. 7 is a schematic diagram of a shaping circuit 112, in accordance with one embodiment. The shaping circuit 112 is one example of a shaping circuit 112 of FIGS. 1, 3, and 4. The shaping circuit 112 includes a first voltage controlled current source that generates a current I1 and includes an internal resistance R7 (not shown) and is controlled by DVS. A variable resistance R5 is coupled between the first current source and ground. The output node of the first current source provides a voltage VREFDVS. The shaping circuit 112 includes a second current source that generates a current I2. A resistor R6 is coupled between the second current source and ground. The output node of the second current source provides a voltage VREFVTH. A summer generates VGD_REF by summing VREFDVS and VREFVTH.

The value of the variable resistor R5 is set by a gain auto calibration process. Setting the value of the variable resistor R5 corresponds to setting the value of the gain parameter k, inasmuch as k=R5/R7. As will be set forth in more detail below, the other calibration procedure enables configuring the gain parameter k for the selected rectifier switch. The other calibration process can also be active. Accordingly, the gain parameter k can change if the characteristics of the rectifier switch SR vary, for example, if a temperature variation occurs.

In one embodiment, VREFVTH is equal to I2*R6 and is a constant corresponding to V1. In one embodiment, VREFDVS is equal to I1*R2, which is equal to DVS*R2/R7. The result is that the game factor k is equal to R5/R7. Accordingly, VREFDVS=k*DVS.

Figure 8:
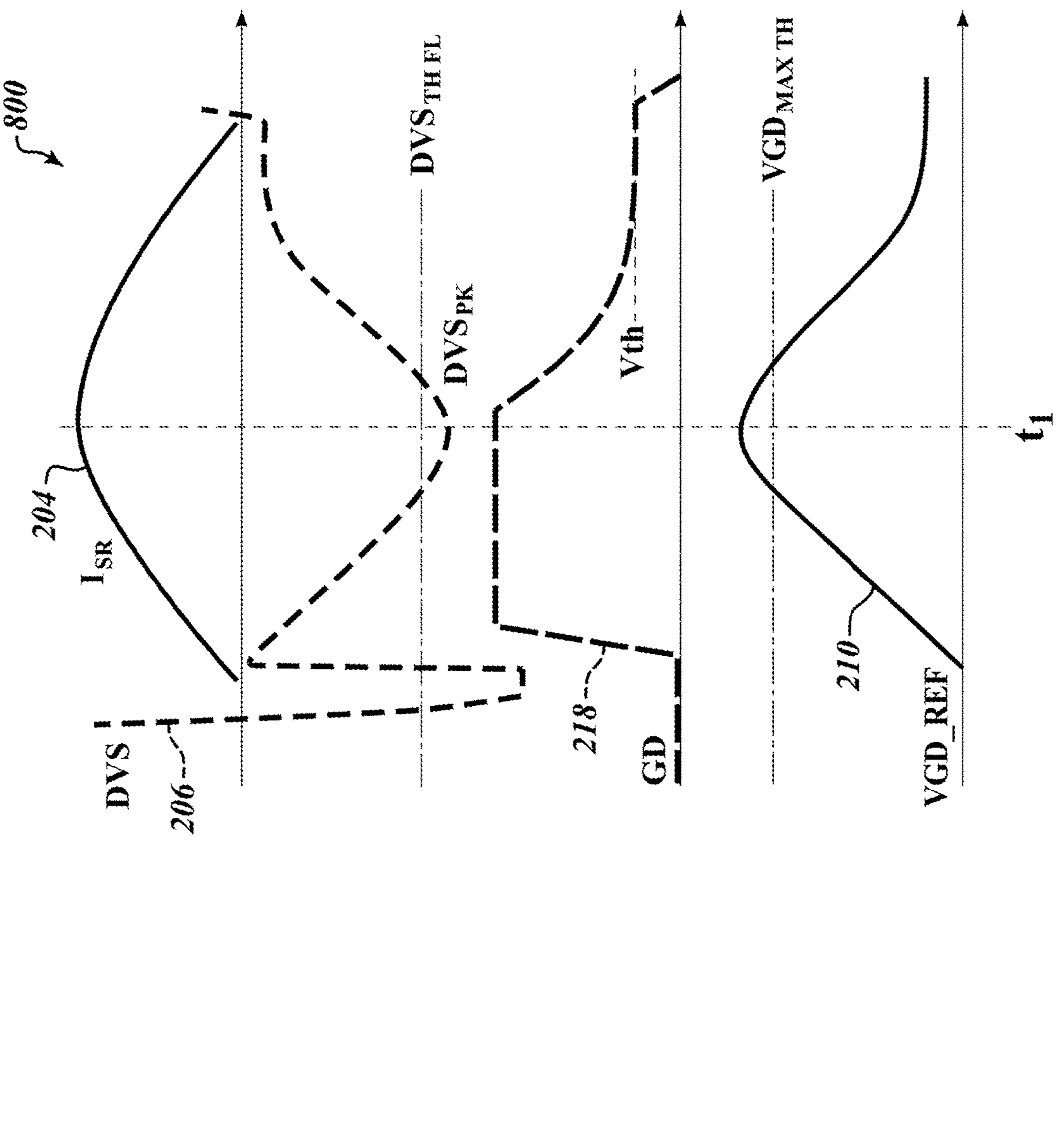
FIG. 8 includes graphs associated with a driver circuit of a synchronous rectifier, in accordance with one embodiment.

FIG. 8 illustrates a graph 800 including signals associated with the rectifier switches SR of FIG. 1, in accordance with one embodiment. The graph 800 is substantially similar to the graph of FIG. 2B in many regards. However, in FIG. 8, a value DVSTHFL is illustrated as a threshold value for DVS. A value VGDMAXTH is also illustrated as a threshold value for VGD_REF. As will be set forth in more detail below, DVSTHFL and VGDMAXTH are utilized in an auto calibration process for the gain parameter k.

In one embodiment, the gain parameter k is initially set to a minimum value. In one example, the starting value is 40. Each cycle the signal VGD_REF is compared to VGDMAXTH. In one example, VGDMAXTH is 10 V.

After a cycle, if VGD_REF is less than VGDMAXTH and DVS is less than DVSTHFL, the k is incremented. In one example, DVSTHFL is-100 mV. After a cycle, if VGD_REF is greater than VGDMAXTH, then k is decremented. If the switching cycle is turned off before time t1, then there is no update of k.

If there is a premature turn off of the rectifier switch SR after t1 but before 75% of the previous cycle duration, k is decremented. This can indicate instability of the circuit.

In a steady-state condition the VGD_REF peak value may have a dinner around VGDMAXTH. The jitter may depend on the chosen increment/decrement step value (e.g., k is incremented or decremented by 1 or some other step value). The k is saturated to a max value. In one example, the maximum k value is 150.

In one embodiment, k can be updated every cycle if VGD_REF is less than VGDMAXTH and DVS is less than DVSTHFL and if k is less than the maximum k value. In one embodiment, k can be updated every nth cycle after VGD_REF is greater than VGDMAXTH or if k=maximum value. In one example, n=8. In one example, the range of k is 50-150. Other values and parameters can be utilized without departing from the scope of the present disclosure.

Figure 9:
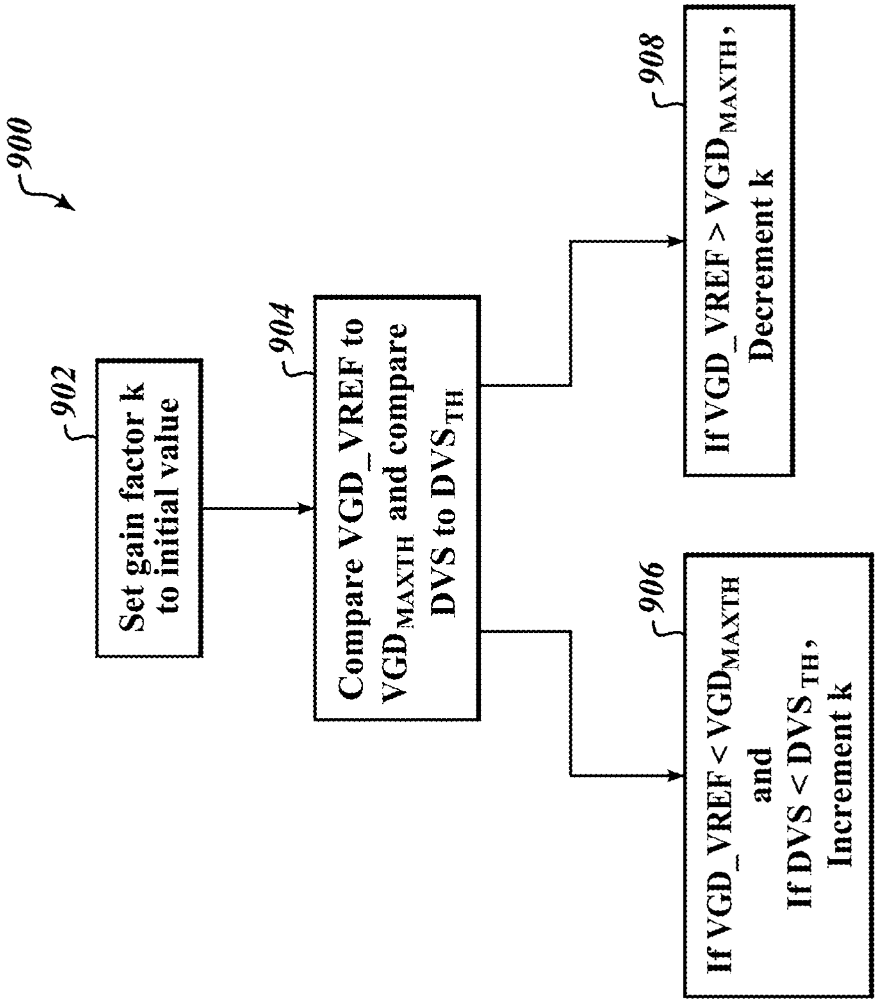
FIG. 9 is a flow diagram of a method for adjusting a gain factor associated with a driver circuit of a synchronous rectifier, in accordance with one embodiment.

FIG. 9 is a flow diagram of a method 900 for adjusting a gain parameter k utilized in writing rectifier switches of a resonant converter, in accordance with one embodiment. The method 900 can utilize components, processes, and systems, described in relation to FIGS. 1-8. The method 900 can correspond to an auto calibration process for the gain parameter k. At 902, the gain parameter k is set to an initial value. In one embodiment, the initial value is a minimum value of k. At 904, VGD_REF is compared to VGDMAXTH and DVS is compared to DVSTHFL. At 906, if VGD_REF is less than VGDMAXTH and if DVS is less than DVSTHFL, then k is incremented by a selected step value. In one example, the selected step value is 10, though other values can be utilized without departing from the scope of the present disclosure. At 908, if VGD_REF is greater than VGDMAXTH, then k is decremented by the step value. The method 900 can utilize other steps or combinations of steps, such as those described in relation to FIG. 8, without departing from the scope of the present disclosure.

The auto calibration of the gain parameter k avoids tedious manual parameter configuration processes and allows a simple solution for users of the resonant converter. This results in cost savings as there is no call for additional external components for a manual configuration process. This also results in a fast start of time. Furthermore, there is no need to change the configuration every time that external rectifier switch MOSFET is changed. The DVS shaping control is all is configured correctly independently of variations in a rectifier switch SR.

Figure 10:
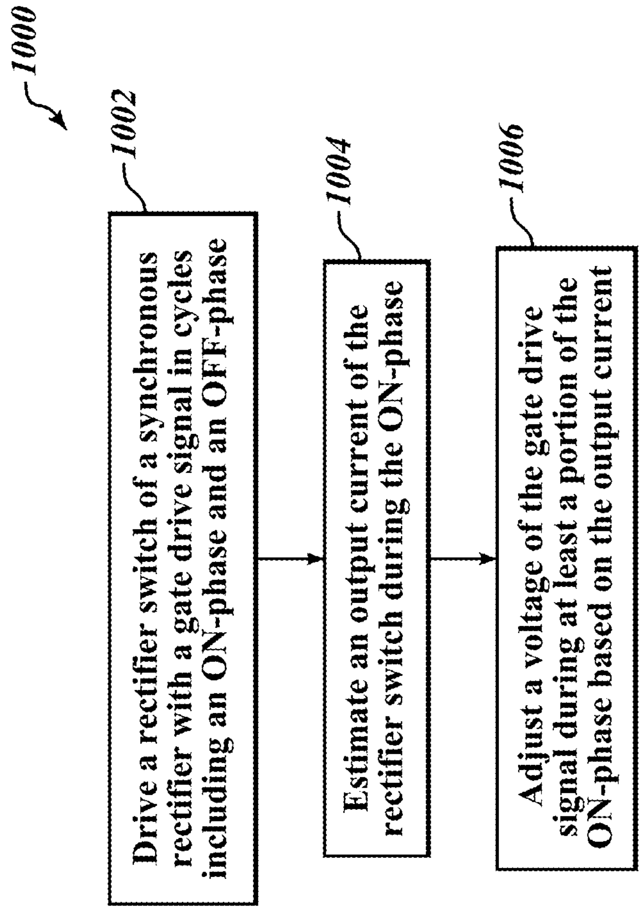
FIG. 10 is a flow diagram of a method for operating a synchronous rectifier, in accordance with one embodiment.

FIG. 10 is a flow diagram of a method 1000 for operating a synchronous rectifier, in accordance with one embodiment. The method 1000 can utilize components, processes, and systems described in relation to FIGS. 1-9. At 1002, the method 1000 includes driving a rectifier switch of a synchronous rectifier with a gate drive signal in cycles including an on-phase and an off-phase. At 1004, the method 1000 includes estimating an output current of the rectifier switch measuring the voltage across the rectifier switch during the on-phase. At 1006, the method 1000 includes adjusting a voltage of the gate drive signal during at least a portion of the on-phase based on the output current.

Figure 11:
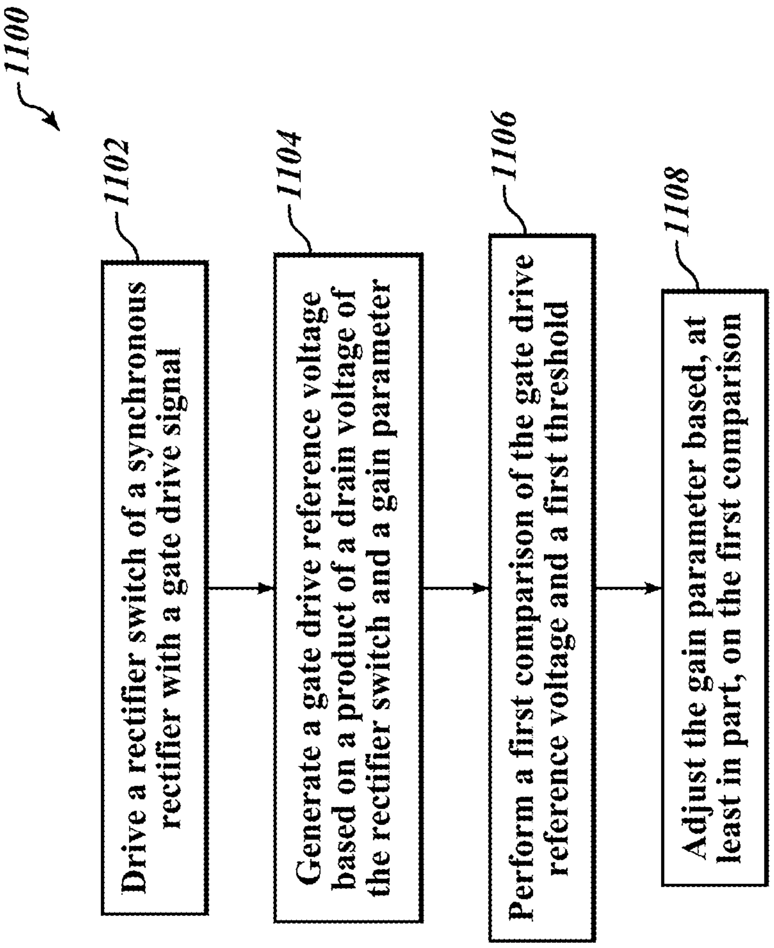
FIG. 11 is a flow diagram of a method for operating a synchronous rectifier, in accordance with one embodiment.

FIG. 11 is a flow diagram of a method 1100 for operating a synchronous rectifier, in accordance with one embodiment. The method 1100 can utilize components, processes, and systems described in relation to FIGS. 1-9. At 1102, the method 1100 includes driving a rectifier switch of a synchronous rectifier with a gate drive signal. At 1102, the method 1104 includes generating a gate drive reference voltage based on a product of a drain voltage of the rectifier switch and a gain parameter. At 1106, the method 1100 includes performing a first comparison of the gate drive reference voltage and a first threshold. At 1108, the method 1100 includes adjusting the gain parameter based, at least in part, on the first comparison.

Figure 12:
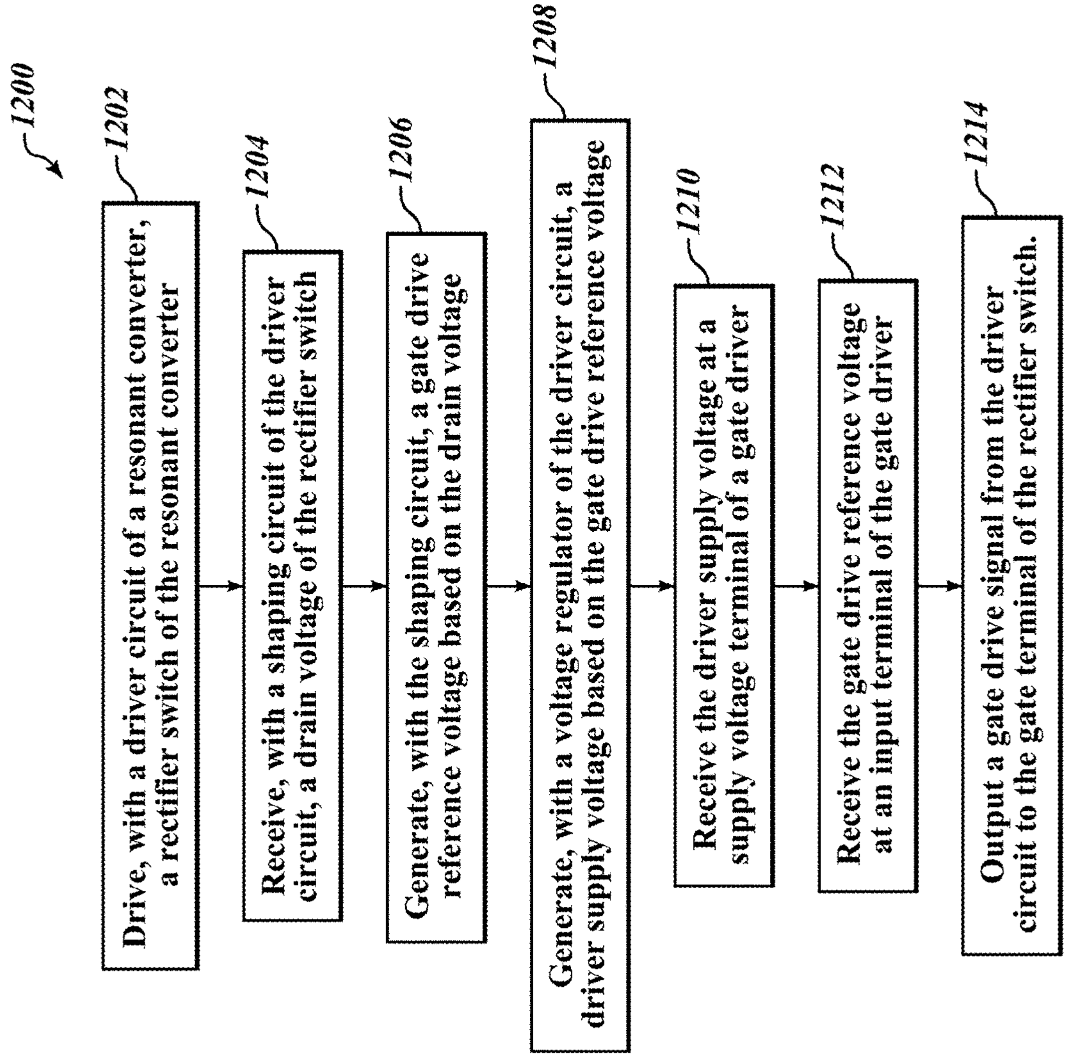
FIG. 12 is a flow diagram of a method for operating a synchronous rectifier, in accordance with one embodiment.

FIG. 12 is a flow diagram of a method 1200 for operating a synchronous rectifier, in accordance with one embodiment.

The method 1200 can utilize components, processes, and systems described in relation to FIGS. 1-9. At 1202, the method 1200 includes driving, with a driver circuit of a resonant converter, a rectifier switch of the resonant converter. At 1204, the method 1200 includes receiving, with a shaping circuit of the driver circuit, a drain voltage of the rectifier switch. At 1206, the method 1200 includes generating, with the shaping circuit, a gate drive reference voltage based on the drain voltage. At 1208, the method 1200 includes generating, with a voltage regulator of the driver circuit, a driver supply voltage based on the gate drive reference voltage. At 1210, the method 1200 includes receiving the driver supply voltage at a supply voltage terminal of a gate driver of the driver circuit. At 1212, the method 1200 includes receiving the gate drive reference voltage at an input terminal of the gate driver. At 1214, the method 1200 includes outputting a gate drive signal from the gate driver to a gate terminal of the rectifier switch.

Figure 13:
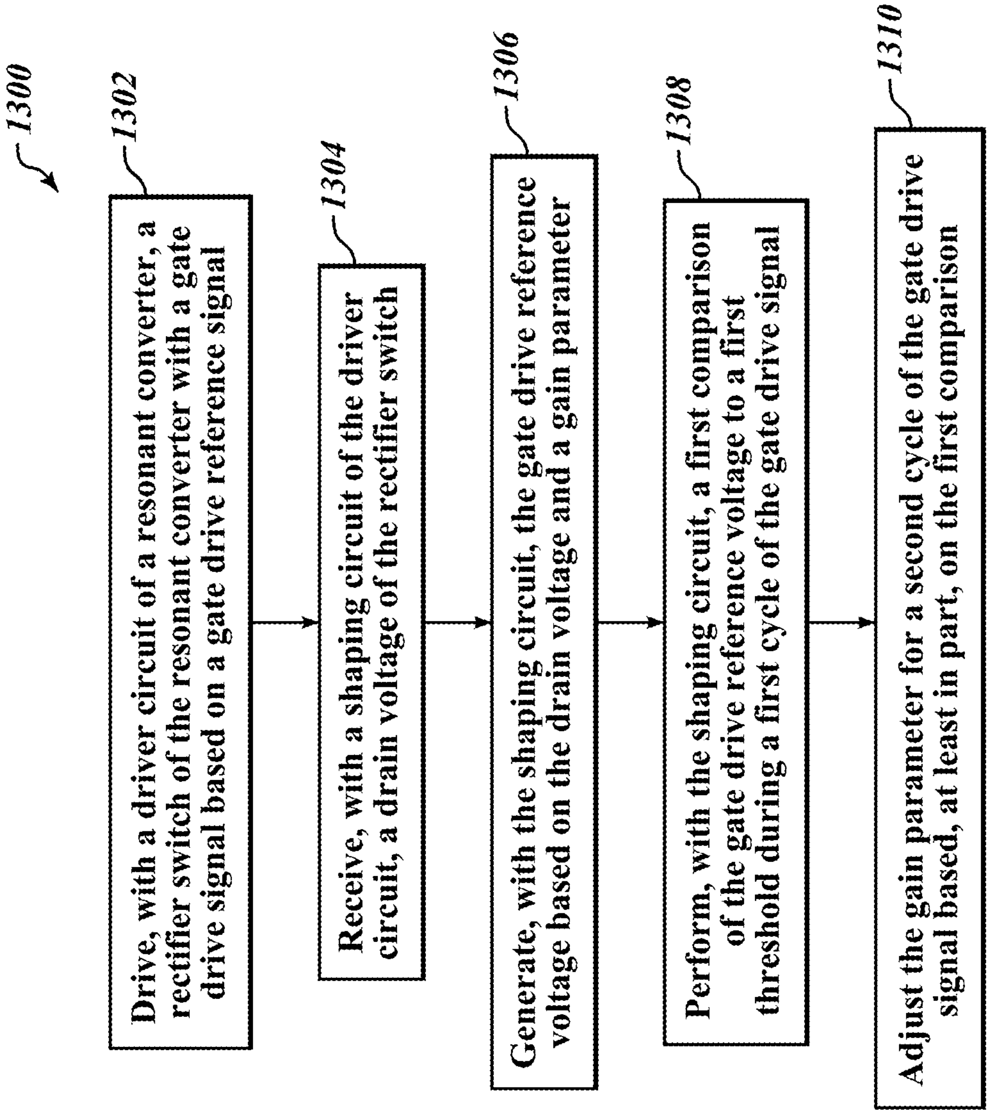
FIG. 13 is a flow diagram of a method for operating a synchronous rectifier, in accordance with one embodiment.

FIG. 13 is a flow diagram of a method 1300 for operating a synchronous rectifier, in accordance with one embodiment. The method 1300 can utilize components, processes, and systems described in relation to FIGS. 1-9. At 1302, the method 1300 includes driving, with a driver circuit of a resonant converter, a rectifier switch of the resonant converter with a gate drive signal based on a gate drive reference signal. At 1304, the method 1300 includes receiving, with a shaping circuit of the driver circuit, a drain voltage of the rectifier switch. At 1306, the method 1300 includes generating, with the shaping circuit, the gate drive reference voltage based on the drain voltage and a gain parameter. At 1308, the method 1300 includes performing, with the shaping circuit, a first comparison of the gate drive reference voltage to a first threshold during a first cycle of the gate drive signal. At 1310, the method 1300 includes adjusting the gain parameter for a second cycle of the gate drive signal based, at least in part, on the first comparison.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising: driving a gate terminal of a rectifier switch of a synchronous rectifier with a gate drive signal in cycles, wherein each cycle includes an on-phase and an off-phase; generating a gate drive reference voltage based on a drain voltage of the rectifier switch; storing a peak value of the gate drive reference voltage for each cycle; generating, with a voltage regulator, a gate driver supply voltage as an average of the peak value of the gate drive reference voltage over n cycles, where n is an integer greater than 1; and adjusting a voltage of the gate drive signal based on the gate driver supply voltage.

2. The method of claim 1, further comprising estimating an output current of the rectifier switch during the on-phase, wherein estimating the output current includes measuring the drain voltage of the rectifier switch.

3. The method of claim 1, comprising:

holding the voltage of the gate drive signal at a maximum value during a first portion of the on-phase; and adjusting the voltage of the gate drive signal proportional to the output current during a second portion of the on-phase.

4. The method of claim 3, comprising:

receiving the driver supply voltage at a supply terminal of a gate driver;

receiving the gate drive reference voltage at an input terminal of the gate driver; and outputting the gate drive signal from an output terminal of the gate driver.

5. The method of claim 1, wherein the voltage regulator includes a node that stores the average of the peak value.

6. The method of claim 5, wherein the voltage regulator includes an operational amplifier including a non-inverting input coupled the average of the peak value, an output that provides the driver supply voltage, and an inverting input coupled to the output in a feedback configuration.

7. The method of claim 5, wherein the voltage regulator includes a storage capacitor coupled to the node and configured to store the average of the peak value.

8. The method of claim 7, wherein the voltage regulator includes:

an input configured to receive the gate drive reference voltage;

a first capacitor coupled to the input node; and a first switch coupled between the first capacitor and the storage capacitor.

9. A device, comprising: a synchronous rectifier driver circuit configured to drive a gate terminal of a rectifier switch with a gate drive signal in cycles, wherein each cycle includes an on-phase and an off-phase, wherein the synchronous rectifier driver circuit includes: a shaping circuit configured to receive a drain voltage signal indicating a voltage of a drain terminal of the rectifier switch and to generate a gate drive reference voltage; a voltage regulator configured to receive the gate drive reference voltage and a supply voltage, to store a peak value of the gate drive reference voltage for each cycle and to generate a driver supply voltage as an average of the peak value of the gate drive reference voltage over n cycles, where n is an integer greater than 1; and a gate driver having a first input configured to receive the gate drive reference voltage, a supply input configured to receive the driver supply voltage, and an output configured to output the gate drive signal to the gate terminal of the rectifier switch and to adjust a voltage of the gate driver signal based on the gate driver supply voltage.

10. The device of claim 9, wherein the voltage regulator includes a node that stores the average of the peak value.

11. The device of claim 10, wherein the voltage regulator includes an operational amplifier including a non-inverting input coupled the average of the peak value, an output that provides the driver supply voltage, and an inverting input coupled to the output in a feedback configuration.

12. The device of claim 10, wherein the voltage regulator includes a storage capacitor coupled to the node and configured to store the average of the peak value.

13. The device of claim 12, wherein the voltage regulator includes:

an input configured to receive the gate drive reference voltage;

a first capacitor coupled to the input; and a first switch coupled between the first capacitor and the storage capacitor.

14. The device of claim 13, wherein the first capacitor has a capacitance equal to a capacitance of the storage capacitor divided by n.

15. A method, comprising: driving, with a driver circuit of a resonant converter, a rectifier switch of the resonant converter with a gate drive signal in cycles, wherein each cycle includes an on-phase and an off-phase; receiving, with a shaping circuit of the driver circuit, a drain voltage of the rectifier switch; generating, with the shaping circuit, a gate drive reference voltage based on the drain voltage; storing a peak value of the gate drive reference voltage for each cycle; generating, with a voltage regulator of the driver circuit, a driver supply voltage as an average of the peak value of the gate drive reference voltage over n cycles, where n is an integer greater than 1; receiving the driver supply voltage at a supply voltage terminal of a gate driver of the driver circuit; receiving the gate drive reference voltage at an input terminal of the gate driver; and outputting the gate drive signal from the gate driver to a gate terminal of the rectifier switch; and adjusting a voltage of the gate drive signal based on the gate driver supply voltage.

16. The method of claim 15, comprising storing the average of the peak value at a storage node of the voltage regulator.

17. The method of claim 16, wherein the voltage regulator includes an operational amplifier including a non-inverting input coupled the average of the peak value, an output that provides the driver supply voltage, and an inverting input coupled to the output in a feedback configuration.

18. The method of claim 16, including storing the average of the peak value with a storage capacitor of the voltage regulator.

19. The method of claim 18, wherein the voltage regulator includes:

an input configured to receive the gate drive reference voltage;

a first capacitor coupled to the input; and a first switch coupled between the first capacitor and the storage capacitor.

20. The method claim 19, wherein the first capacitor has a capacitance equal to a capacitance of the storage capacitor divided by n.

* * * * *